Nov. 29, 1966 ICHIRO ARIMURA ETAL 3,288,923
SYNCHRONIZING APPARATUS USING CONTROLLED SLIP SYNCHRONOUS MOTOR
Filed Oct. 19, 1962 6 Sheets-Sheet 1

Inventors
Ichiro Arimura
Sadaharu Wada
By Stevens, Davis, Miller & Mosher
Attorneys Nov. 29, 1966  ICHIRO ARIMURA ET AL  3,288,923
SYNCHRONIZING APPARATUS USING CONTROLLED SLIP SYNCHRONOUS MOTOR
Filed Oct. 19, 1962                                6 Sheets-Sheet 2

Inventors
Ichiro Arimura
Sadaharu Wada
By *Stevens, Davis, Miller & Mosher*
Attorneys

Fig. 21
Signal at point 201, 203.

Inventors
Ichiro Arimura
Sadaharu Wada
By Stevens, Davis, Miller & Mosher
Attorneys

Inventors
Ichiro Arimura
Sadaharu Wada
By Stevens, Davis, Miller & Mosher
Attorneys

Fig. 24
Signal at point 231, 232, 233.

Input signal at point 251.

Current signal at point 252.

Fig. 28

Fig. 27 note 1; Tracing length of the video head in the recording condition.

2; Effective tracing length of the video head in the reproducing condition.

Fig. 29

Inventors
Ichiro Arimura
Sadaharu Wada
By Stevens, Davis, Miller & Mosher
Attorneys

United States Patent Office 3,288,923
Patented Nov. 29, 1966

3,288,923
SYNCHRONIZING APPARATUS USING CONTROLLED SLIP SYNCHRONOUS MOTOR
Ichiro Arimura, Kyoto, and Sadaharu Wada, Osaka, Japan, assignors to Matsushita Electric Industrial Co., Ltd., Osaka, Japan, a corporation of Japan
Filed Oct. 19, 1962, Ser. No. 231,793
Claims priority, application Japan, Oct. 21, 1961, 36/38,190; Sept. 27, 1962, 37/42,361, 37/42,362
10 Claims. (Cl. 178—6.6)

This invention relates to synchonizing apparatus having rotating mechanisms in frequency- and phase-synchronism with the electrical sources of any type, and, particularly to such apparatus in which synchronous electrical motors are used as rotating mechanisms and substantially completely synchronized both in frequency and phase with the electrical sources under the principle of so-called "aquisition system."

Synchronous motors are in broad use as machines that rotate in freqeuncy- and phase-synchronism with the electrical sources for driving them. Heretobefore, the synchronization characters of synchronous motors have been believed well reliable, and a minor error in synchronism, such as, for example, one-revolution desynchronization for several hundred thousands of revolutions has been allowed as negligible.

However, some of recently developed applications of synchronous motors do not allow such a minor desynchronization as above, as seen in video-tape recording of television images.

One of the most well known video recording apparatus is that in which electrical signals of television images are directly recorded on a magnetic tape, which are then reproduced when desired to supply the above-mentioned electrical signals to a television receiver where the television images are reproduced.

When a magnetic tape usually employed in magnetic sound recording is used for directly recording thereon extremely high frequency signals or extremely broad frequency band signals, such as television signals, and in order to have high frequency components of the recorded signals adequately reproduced, the relative speed between the gap of recording or reproducing head and the recording medium running therethrough should be made extremely high. For this purpose, in recording a fifteen-minute television program, for example, extremely large and awkward tape-reels are necessary to use, accompanied by other various inconveniences and disadvantages. Various methods have been proposed to avoid such a high speed and resulting complexity.

One of the most successful methods of decreasing the tape speed is to use multiple recording heads. By moving such heads mechanically at a high speed transversely with respect to the tape, the required relative speed is obtained between the recording heads and the tape. The tape is caused to run through the heads at a speed of 15 inch/sec. longitudinally, so that the signals are recorded in a series of transversal lines or tracks on the tape. Such a system provides acceptable recording to a certain extent, but necessitates four recording heads precisely mounted assembled on a disc rotating at a speed of 14,400 r.p.m. A synchronous motor is employed for receiving and rotating the four recording heads. However, even if such a minor out-of-synchronism as is negligible in ordinary applications should occur in the above synchronous motor, discontinuity of reproduced signals would result straightway, presenting readily appreciable crisscross pictures on the television screen.

In order to solve such a problem of desynchronization, that is, to precisely synchronize signals between the recording and reproducing periods, a system is provided for synchonizing mechanical constitutional elements.

Several types of automatic controls are adapted for accomplishing the required synchronization, and control systems including rotating mechanisms or motors are predominant. Frequency control is one which controls the rotating speed of the motor for accompanying the required synchronization. This system has such a frequency of the electrical source that the control reference of the automatic control system is in synchronism with the number of revolutions of the motor. Thus, if, a synchronous motor is employed, the fact is utilized that the frequency of the electrical source therefore and the speed thereof are linearly proportional mathematically. In order to have this method successful, the electrical source for the motor should be entirely isolated from commercial supply sources, and a separate driving amplifier is necessary to provide.

Accordingly, an object of the present invention is to provide an improved and complete synchronizing apparatus including a synchronous motor.

Another object of the invention is to provide an apparatus of the kind specified in which the acquisition system is adopted, utilizing the slip of the synchonous motor for maintaining the complete synchronism.

A further object of the invention is to provide an apparatus of the kind specified comprising means for producing a signal synchronized with the rotation of the synchronous motor, means for obtaining a signal in synchronism with the frequency and the phase of the electrical source for driving the synchonous motor, and means for comparing the above-mentioned two signals with each other for obtaining an error output signal corresponding to the phase difference therebetween, the slip of the synchronous motor being utilized to maintain the value of the error output signal always constant in order to effect a completely synchronous rotation of the synchronous motor.

A further object of the invention is to provide an apparatus of the kind specified comprising means for producing slip of the synchronous motor responsive to that component only of the error output signal which has changed with a constant value of the signal as the center, and means for opening the control loop so that the slip of the synchronous motor is not produced during the period in which the error output signal keeps a constant value.

A still further object of the invention is to provide an apparatus of the kind specified in which a commercial A.C. supply source may be utilized for driving the synchronous motor.

A further object of the invention is to provide an apparatus of the kind specified comprising means for selectively generating on- and off-control signals respectively according to whether the error output signal keeps a constant value or not, and means responsive to the on- and off-control signals respectively for terminating and producing the slip of the synchronous motor.

A further object of the invention is to provide an apparatus of the kind specified comprising means for producing an off- or on-error output signal according to whether the phase difference between the afore-mentioned two signals is zero or not, and means responsive to the off- or on-error output signal for terminating or producing the slip of the synchronous motor.

A still further object of the invention is to provide an apparatus of the kind specified comprising means for giving a delay time corresponding to a constant value of the error output signal to either one of the afore-mentioned two signals before these signals are compared with respect to their phases, and means for providing a constant value of the error output signal when the afore-mentioned two signals are in phase.

A further object of the present invention is to provide means for applying the afore-mentioned complete synchronization of the acquisition system utilizing the synchronous motor slip to a magnetic recording and reproducing apparatus, and particularly means for applying the same to magnetic recording and reproducing apparatus for television signals having a plurality of rotary magnetic transducers.

A further object of the invention is to provide an apparatus of the kind specified comprising the afore-mentioned synchronous motor for driving the rotary magnetic transducers, and means for maintaining the synchronism thereof with the input signal.

A further object of the invention is to provide an apparatus of the kind specified comprising means for applying composite television signals to the input signal during recording, and means whereby the synchronizing signal in the input composite television signals inserted during the blanking period is in synchronism with the frequency and the phase of a suitable electrical source for driving the synchronous motor.

A further object of the invention is to provide an apparatus of the kind specified comprising means for synchronizing the blanking periods of the input composite television signals during recording and the electronic switching periods of the rotary magnetic transducer output signals during reproducing.

Other objects and particularities of the present invention will be made obvious from the following detailed descriptions of preferred embodiments of the invention with reference to the accompanying drawings, in which.

Figure 1:
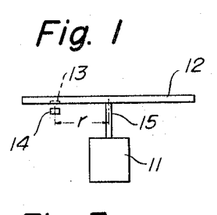
FIG. 1 and FIG. 2 show diagrammatically a synchronous motor driven by an electrical source according to the invention.

Referring to FIG. 1 and the following figures of drawings, there is shown a simple and perfect synchronizing apparatus easy in maintenance in which the "acquisition system" utilizing the afore-mentioned synchronous motor slip is adopted. Before explaining the apparatus according to the present invention in detail, it will be advisable to explain the prior art to a certain extent, in order that the present invention shall be well comprehended.

As is mentioned hereinbefore, several examples of the prior art may be referred to, but one that is considered most typical at present will be described. This is the "Amplex system" developed by Ampex Corporation of Redwood City, Calif., U.S.A., and disclosed in detail in "Electronics" for August 1957, pp. 138–144.

Figure 11:
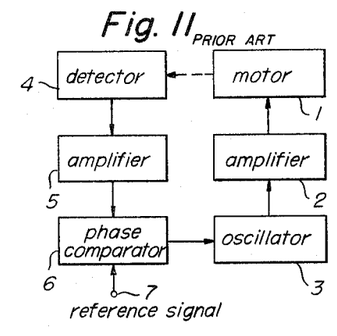
FIG. 11 is a block diagram showing a prior art synchronizing apparatus.

The Ampex system has a construction as shown in FIG. 11, and comprises a synchronous motor 1 which drives a magnetic head drum receiving magnetic transducers, not shown, at a speed of 14,400 r.p.m., and usually called "head-drum motor." The automatic control system including the head-drum motor is called "drum servo systems."

In such a control system, the control reference is the frequency of the electrical source in synchronism with the speed of the motor, and the speed of the synchronous-type motor is changed by changing the frequency of the electrical source. For this purpose, the electrical source for the motor 1 should be entirely isolated from any commercial supply source, and instead, a separate motor drive amplifier 2 must be provided, which supplys the whole power for driving the motor 1. The frequency of the source is under control of an oscillator 3, the output thereof being applied to the amplifier 2. Along with the movement of the magnetic drum head driven by the motor 1, an electrical signal is generated which has a synchronousness linearly proportional to the above-referred movement. This signal is detected by a detector 4, and is called "PEC signal." The signal detected by the detector 4 is amplified by an amplifier 5, and the output thereof is applied to a phase comparator 6. Another electrical signal enters into the phase comparator 6 as a reference signal at another input terminal 7. This reference signal may be obtained from the vertical synchronizing signal of the input video signal during image recording. During reproducing operation, the reference signal is obtained from the A.C. source frequency. The phase comparator 6 compares the detected signal with the reference signal with respect to their phases, and delivers D.C. output proportional to the phase difference between the two input signals, that is, the phase error, to the oscillator 3, which varies its oscillating frequency according to the D.C. input from the phase comparator 6. Thus, the speed of the motor 1 is under control of the oscillator 3, and an electrical signal proportional to the speed is fed back to the phase comparator through the detector 4. It is to be understood that there are naturally required large scale motor drive amplifier and corresponding oscillator. In addition, the relatively complicated principle of operation introduces various inconveniences and defaults into the Ampex system.

Contrary to the above, the present invention provides a simple and perfect synchronizing apparatus easy in maintenance, without being accompanied by such inconveniences and defaults as are inevitable in the Amplex system.

Figure 2:
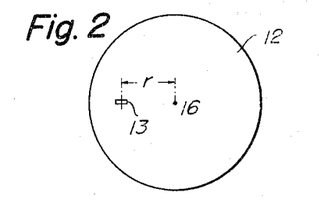

Referring now to FIGS. 1 and 2, a rotating drum 12 is mounted on the shaft 15 of a synchronous motor 11. The drum 12 carries a small piece magnet 13 received in or fixed thereto at a radial distance r from the center 16 of the shaft 15. On the other hand, a detecting head 14 is stationarily mounted along with the synchronous motor 11 at such a position as to intersect the magnetic flux produced by the magnet 13, that is to say, at a radial distance r from the centre 16 of the shaft 15, but in a plane displaced from that of the magnet 13.

Figures 3, 4, 5, 6:
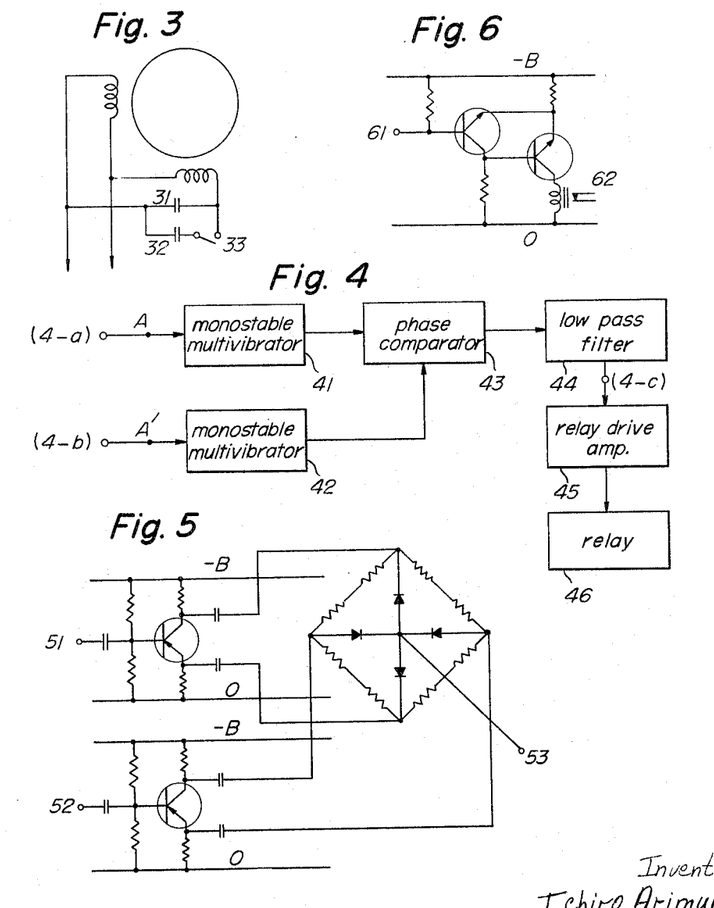
FIG. 3 is a diagrammatic representation of the circuit of the synchronous motor of FIG. 1.
FIG. 4 is a block diagram showing an example of the circuitry for controlling the synchronous motor of FIGS 1 to 3.
FIG. 5 shows an example of the phase comparator shown in FIG. 4.
FIG. 6 shows an example of the relay drive amplifier shown in FIG. 4.

The synchronous motor 11 has a connection as shown in FIG. 3. A lead capacitor 31 has an additional capacitor 32 connected in shunt therewith through a relay contact 33.

Referring to FIG. 4, the input comprises a signal 4–a which is the detecting head output in synchronism with the rotation of the rotating drum 12, and a signal 4–b which is in synchronism with the electrical source for driving the synchronous motor 11. The input signals 4–a and 4–b are introduced into monostable multivibrators 41 and 42, respectively, whose outputs are applied to the respective input terminals of a phase comparator 43. The output of the phase comparator 43 passes through a low-pass filter 44 wherein the output is subjected to band limitation, and is applied to a relay drive amplifier 45, the output of which drives a relay 46.

An example of the phase comparator is shown in FIG. 5, and comprises two transistors and four diodes. The input signals are applied to the respective input terminals 51 and 52, and the output is taken out at the output terminal 53.

The relay drive amplifier may be as shown in FIG. 6. It comprises two transistors and forms a kind of Schmitt circuit. Input is applied to the terminal 61, and its variation causes a discontinuous change in the current flowing through a relay 62, and accordingly the relay 62 is optionally actuated to on or off condition.

Figure 7:
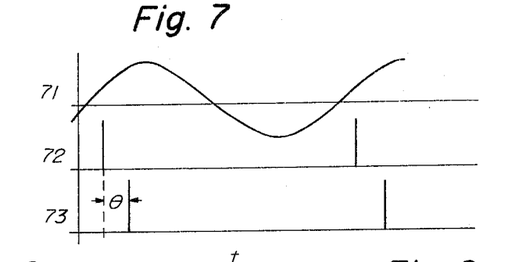
FIG. 7 shows the phase relation of the input signal introduced into the circuitry of FIG. 4.

Assuming that the synchronous motor 11 has a synchronous speed of 3600 r.p.m., the output induced by cooperation of the magnet 13 and the detecting head 14 is a pulse signal of 60 p.p.s. in synchronism with the rotation of the synchronous motor. The phase relation between the detecting head output 72 and the 60 p.p.s. pulse signal 73 is graphically shown in FIG. 7 with reference to the electrical power 71 driving the synchronous motor. The phase difference between the detecting head output 72 and the pulse signal 73 synchronous with the rotation of the synchronous motor is shown by $\theta$.

The present invention aims to make the phase difference $\theta$ constant. When the phase difference $\theta$ would tend to decrease ($\theta \rightarrow 0$), the synchronous motor 11 should be caused to slip to have the phase of the detecting head output 72 apparently lagging by $360° - \theta$, whereupon the slip is made "off" and the synchronous speed is reinstated. A circuit arrangement adapted for such an operation is shown in FIG. 4.

Referring again to FIG. 3, when the additional or slip capacitor 32 is connected in parallel with the lead or synchronizing capacitor 31 upon closure of the relay contact 33, the motor 11 begins to make a periodical slip which is very slow in comparison with the period of the electrical source for driving the motor, the slip capacitor 32 being so related with the synchronizing capacitor 31 as to afford the above operation. In practice, the ratio of capacitor 32 to capacitor 31 is about 0.2 and the slip period is 5 sec.

Figure 10:
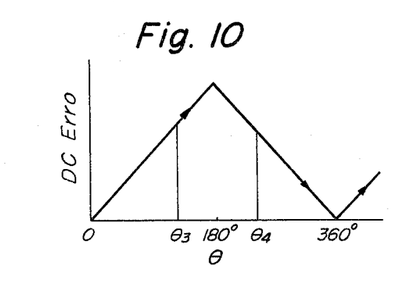
FIG. 10 is a curve diagram for explaining the operation of the synchronizing apparatus shown above.

Referring to FIG. 4, the detecting head output 4–a and the source-synchornized signal 4–b respectively have a period corresponding to 60 p.p.s., and trigger the monostable multivibrator 41 and 42, respectively, to produce rectangular wave outputs of 1/2 power. Such outputs are applied to the phase comparator 43 as exemplified in FIG. 5, and the comparator output passes through the low-pass filter 44 to the relay drive amplifier 45. The low-pass filter 44 having a certain time constant operates to limit the frequency band and also to smooth the wave form, thus providing a D.C. error voltage 4–c for the relay drive amplifier 45. This D.C. error signal varies depending upon the phase difference angle $\theta$ as shown in FIG. 10. Consequently, during slipping, with the circuitry shown in FIG. 4, the phase difference $\theta$ between 4–a and 4–b changes progressively in the direction shown by the arrow in FIG. 10, and a corresponding D.C. error signal is delivered to the relay drive amplifier 45.

As is understood from the above description, in order to make the phase difference $\theta$ to converge ($\theta \rightarrow 0°$), it is sufficient to make the phase of the detecting head output to lag apparently by $360° - \theta$. This causes $\theta$ to vary, and the D.C. error voltage at $\theta = 360°$ operates the relay drive amplifier, the output of which actuates the relay 46 to disconnect the slip capacitor 32, whereupon the synchronous motor 11 operates at the synchronous speed condition. The above is an ideal operation.

Figure 8:
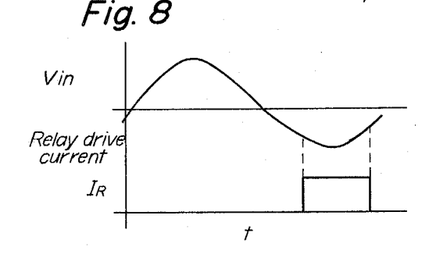
FIGS. 8 and 9 give diagrams for facilitating the explanation of the operation of the circuit shown in FIG. 6.
Figure 9:
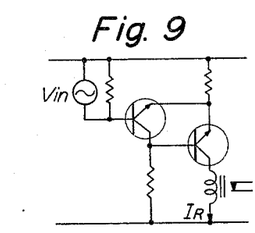

In practice however, when the relay drive amplifier 46 is in the form of Schmitt circuit as shown in FIG. 6 or 9, there is observed a hysteresis phenomena as shown in FIG. 8, and consequently, in order that the D.C. error voltage can operate the Schmitt circuit, $\theta$ should have a value other than zero. For example, the relay drive amplifier 45 may operate to change its operative point at an error voltage given within the range from $\theta = \theta_3$ to $\theta = \theta_4$, where $0° < \theta_3 < 180°$ and $180° < \theta_4 < 360°$. The relay 46 should have such a circuitry that the synchronous motor 11 is in the synchronous speed condition in the above regions.

Assuming now in the arrangement shown in FIG. 4 that $\theta$ is set to satisfy $0 < \theta < \theta_3$ or $(360° - \theta_4) < \theta < 360°$, the synchronous motor begins automatically to slip along the arrowed curve shown in FIG. 10, since the slip capacitor 32 additionally acts to the lead capacitor 31 by operation of the relay 33 or 46, and the D.C. error voltage of $\theta_3$ phase actuates the relay drive amplifier 45. The relay 46 thus switches the contact to "slip off," whereupon the slip capacitor 32 is disconnected, and the lead capacitor 31 only acts to have the synchronous motor in the synchronous speed condition, maintaining the value of $\theta_3$.

The foregoing description is to some extent beside the point to have $\theta$ converging ($\theta \rightarrow 0°$) as initially intended, and the arrangement shown in FIG. 4 may be modified by additionally disposing a delay circuit, such as monostable multivibrator, at the point A or A' to have $\theta$ lagging by $360° - \theta_3$ in order to have $\theta_3$ apparently displaced to the phase position of $\theta_3 = 360°$.

If $\theta$ is set to satisfy $-\theta_3 \theta < 360 - \theta_4$, the synchronous motor 11 is not at the Schmitt transition point, and the slip capacitor is disconnected, so that the synchronous motor 11 is in the synchronous speed condition, resulting in mis-sensing, but the above-mentioned value of $\theta_3$ cannot be attained. At such a time, a suitable measure is necessary to resort for confirming that region, as well as for getting away automatically or manually therefrom. After having gotten away from such a region, the synchronous motor attains the synchronous speed automatically with the phase value of $\theta$, just as hereinabove be explained.

The foregoing explanation is with the assumption that the phase difference $\theta$ is being converged ($\theta \rightarrow 0$), but if $\theta$ is being converged to $\theta'$ ($\theta \rightarrow \theta'$), it will be readily understood that delay circuits may be disposed at A and A' in FIG. 4, respectively, for accomplishing similar results.

Figure 12:
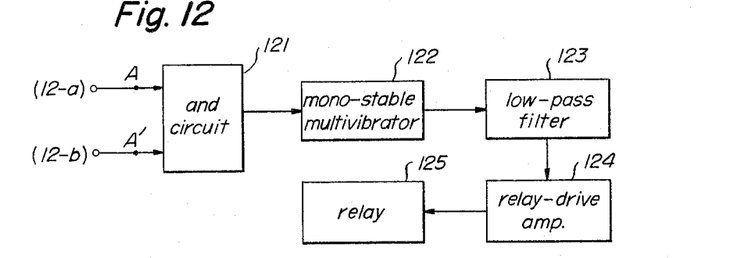
FIG. 12 is a block diagram of a circuitry for controlling a synchronous motor according to the present invention.

Referring to FIG. 12, the input similarly comprises a detecting head output signal 12–a in synchronism with the rotation of the rotating drum, and a signal 12–b, in synchronism with the electrical source for driving the synchronous motor. These signals are introduced into an "And" circuit 121, and the output of the latter is applied to a monostable multivibrator 122. The output of the multivibrator 122 passes through a low-pass filter 123 to a relay drive amplifier 124 which drives a relay 125.

Figure 13:
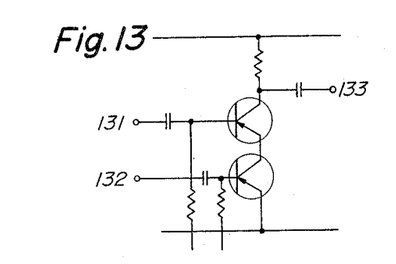
FIG. 13 shows an example of the "and" circuit shown in FIG. 12.
Figure 14:
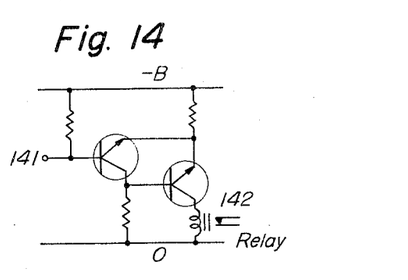
FIG. 14 shows an example of the relay drive amplifier shown in FIG. 12.

One example of the "And" circuit 111 is shown in FIG. 13, and comprises two transistors. The two input signals are applied to terminals 131 and 132, respectively, and the output appears at a terminal 133. FIG. 14 shows an example of the relay drive amplifier 124 which also comprises two transistors forming a Schmitt circuit with an input terminal 141, and the change in the input causes discontinuous change of the current flowing through a relay 142 for effecting "on" and "off" of the relay.

Figure 15:
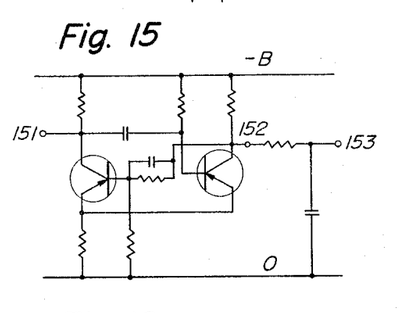
FIG. 15 shows an example of the monostable multivibrator and low-pass filter shown in FIG. 12.

The monostable multivibrator 122 and the low-pass filter 123 are exemplified in FIG. 15. The input trigger is introduced into the multivibrator at a terminal 151, and the output of the latter appears at a connection point 152. This ouput passes through the low-pass filter having an appropriate RC time constant and appears at a terminal 153 as a D.C. signal.

Referring again to FIG. 12, only when the two input signals to the "And" circuit 121 are in phase coincidence, the "And" circuit delivers an output which is 60 p.p.s. pulse signal similar to the input. This is used as the trigger for the following monostable multivibrator 122. The duty ratio of the multivibrator 122 is 0.2–0.8, for example. When there is no trigger input to the multivibrator 122, the connection point 152 (FIG. 15) has a nearly zero potential, and the potential of the output terminal 153 of the low-pass filter is also nearly zero. When the monostable multivibrator 122 is triggered and the output appears at the connection point 152, the output at the terminal 153 of the low-pass filter has an average potential proportional to the duty ratio of the multivibrator 122. Thus, depending upon whether the multivibrator 122 operates or not, the potential at the terminal 153 changes, and this voltage variation causes the operation of the relay drive amplifier 124. As is well-known, the Schmitt circuit forming the relay drive amplifier has a hysteresis character, but such an input change is obtained at the terminal 153 that the hysteresis character is not called to account, and the Schmitt circuit may be considered as effecting merely "on" and "off" operation to actuate the relay 125 forming part of the Schmitt circuit. Consequently, the relay 125 operates only when the phase difference $\theta$ becomes $\theta \rightarrow 0$ to switch its contact for disconnecting the slip capacitor 32 from the circuit. Whereupon, the synchronous motor enters into the synchronous speed condition to accomplish the desired result.

When there is a phase difference between the detecting head output 12–$a$ and the source synchronism signal 12–$b$, there is not 60 p.p.s. pulse signal output in the "And" circuit 121, and consequently, there is no output of the monostable multivibrator 122, and the output voltage of the low-pass filter 123 is nearly zero, so that the relay drive amplifier does not operate, and the slip capacitor 32 is effective to produce the slip of the synchronous motor. When the phase difference becomes zero again, the above-explained desired result is accomplished.

In the foregoing description, the phase difference $\theta$ was automatically converged in $\theta \rightarrow 0$, but when the phase difference is to converge in $\theta \rightarrow \theta'$, monostable multivibrators are additionally disposed at the points A and A', respectively, in FIG. 12.

The basic idea of the present invention has been disclosed in the foregoing descriptions. In order to more concretely disclose the synchronizing apparatus according to the invention, a practical example will be described, wherein the synchronizing apparatus particularly shown in FIG. 12 is applied to magnetic recording and reproducing of broad-band television image signals.

In a system for magnetically recording and reproducing broad-band image signals, a video tape recorder (VTR) having a rotating drum is employed, and here, a VTR with two magnetic heads is described below.

Figure 16:
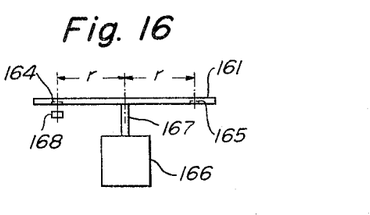
FIGS. 16 and 17 show an example of the synchronous motor used in the synchronizing apparatus according to the present invention.
Figure 17:
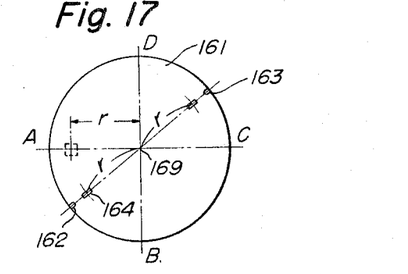

Referring to FIGS. 16 and 17, a rotating drum 161 receives two magnetic heads 162 and 163, for example, video heads formed from ferrite and having an impedance of 1 K$\Omega$. This rotating drum 161 has a diameter of 220 mm., and is coupled to a driving synchronous motor 166, for example, of 117 volt–60 cycle input voltage, four poles and 1800 r.p.m., through a shaft 167. The two video heads 162 and 163 received in the rotating drum 161 are arranged on a straight line passing through the center 169 of the shaft 167, and on this line, two magnets 164 and 165 of say 10 x 2 x 1 mm. are embedded in the drum. When the magnets 164 and 165 revolve, the magnetic fluxes produced thereby are sensed by a detecting head 168 which is similar to conventional audio detectors and of say 3000 turns, 2 K$\Omega$-impedance and 1 mm.-gap. The detecting head is stationarily mounted along with the synchronous motor 161 below the A—C axis. A magnetic tape, that is, a video tape having an iron-oxide layer on a thin base film, not shown, travels along the peripheral surface of the rotating drum 161 slightly over the half arc A—B—C, i.e. 180°, at a speed of about 38 cm./sec. Thus, the relative speed between the video heads 162, 163 and the video tape is about 20 m./sec.

Figure 18:
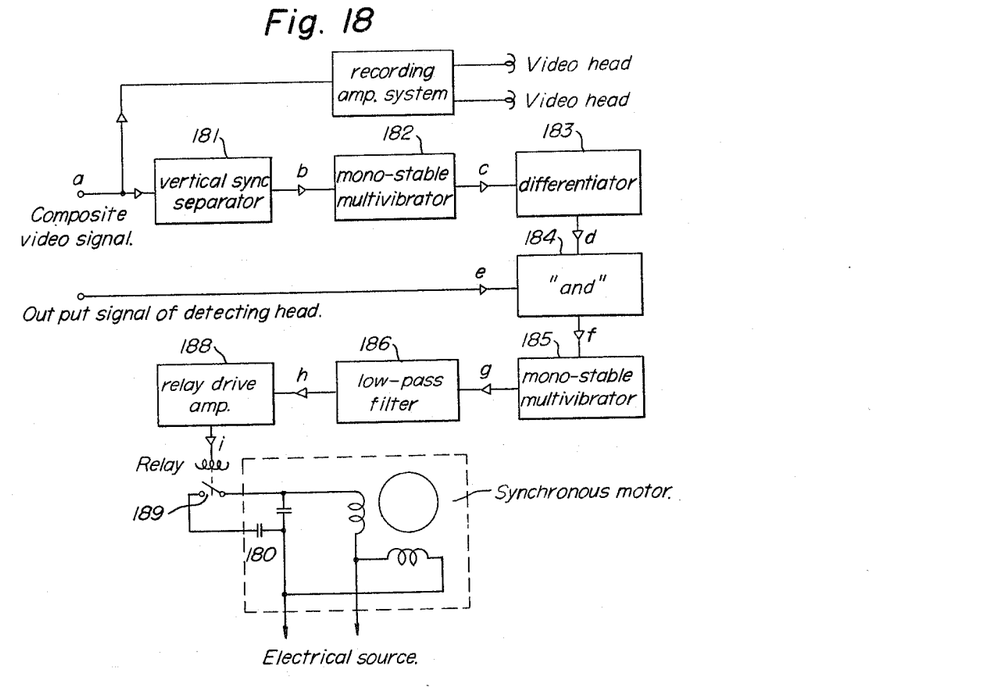
FIG. 18 is a block diagram showing a television image signal recording and reproducing system embodying the present invention.
Figure 19:
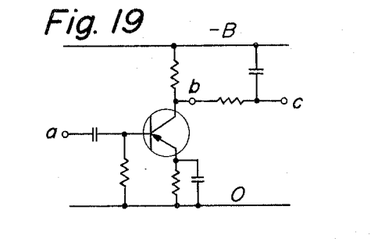
FIG. 19 shows an example of the relay drive amplifier shown in FIG. 18.

In FIG. 18, the synchronizing apparatus embodying the present invention is incorporated in the above-mentioned VTR system. During recording, a part of the input composite television signal 18–$a$ is supplied to the above-mentioned video heads through appropriate processes. Another part is converted to vertical sync 18–$b$ through a vertical sync separator 181, and introduced into a monostable multivibrator 182, the output 18–$c$ of which is differentiated in a differentiating circuit 183. The output 18–$d$ of the differentiating circuit and the detecting head output 18–$e$ are applied to an "And" circuit 184, the output 18–$b$ of which is introduced into a second monostable multivibrator 185, and the output 18–$g$ of the multivibrator 185 passes through a low-pass filter 186 and is subjected to band limitation, and its output 18–$h$ is applied to a relay drive amplifier 188. The output 18–$i$ of the amplifier 188 drives a relay to switch the relay contact 189 which controls the connection and disconnection of a slip capacitor 180. When transistors are employed in the above circuit, and composite video signal having sync signal of minus direction is adopted, the vertical sync signal separator 181 may be as shown in FIG. 19, wherein a PNP transistor is used, and the composite video signal is applied to the terminal 19–$a$. At the connection point 19–$b$, a synchronizing signal output only is obtained, and at the terminal 19–$c$ of an integrating circuit of about 30 $\mu$s.-time constant, a vertical sync signal only appears.

Figure 20:
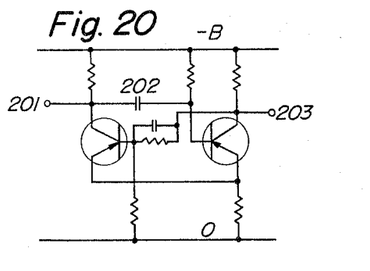
FIG. 20 shows an example of the first monostable multivibrator shown in FIG. 18.
Figure 21:
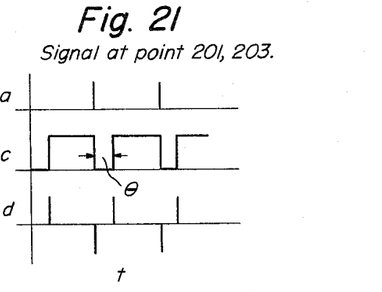
FIG. 21 shows wave forms at various parts of the multivibrator shown in FIG. 20.

FIGS. 20 and 21 show an example of the monostable multivibrator 182. The trigger input is applied to the terminal 201 and a rectangular wave output appears at the terminal 203. The phase difference $\theta$ may be changed according to the value of the capacitor 202.

Figure 22:
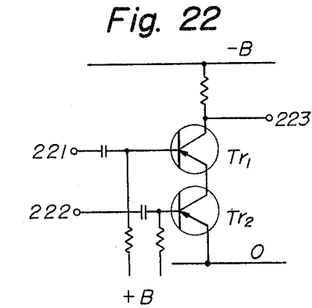
FIG. 22 shows an example of the "And" circuit shown in FIG. 18.
Figure 23:
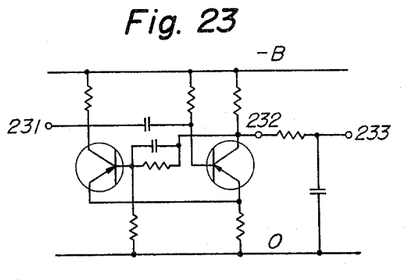
FIG. 23 shows an example of the second monostable multivibrator and low-pass filter shown in FIG. 18.
Figure 24:
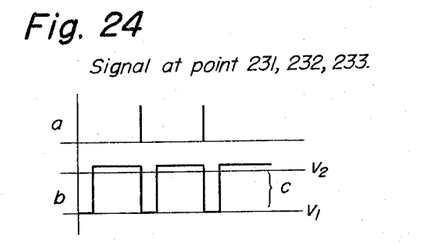
FIG. 24 shows wave forms of signals at various parts of the multivibrator shown in FIG. 23.

FIG. 22 shows an example of the "And" circuit 184. The input signals are applied to the terminals 221 and 222, respectively, and only when the transistors $Tr_1$ and $Tr_2$ become conductive simultaneously, the output appears at the terminal 223. The following monostable multivibrator 185 and low-pass filter 186 are exemplified in FIGS. 23 and 24. When the trigger input is applied to the terminal 231, a rectagular wave output is obtained at the terminal 232. The duty ratio may be determined at will, but about 0.2–0.8 is adopted. The ractangular wave output is rectified by the low-pass filter having a time constant of about 0.3 ms., and a voltage $V_2$ or $V_1$ is obtained at the terminal 233, depending upon whether the rectangular wave output exists or not.

Figure 25:
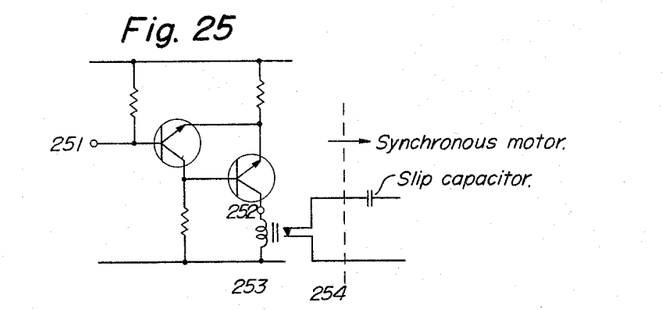
FIG. 25 shows an example of the relay drive amplifier and relay circuit shown in FIG. 18 with illustration of the construction and operation thereof.
Figure 26:
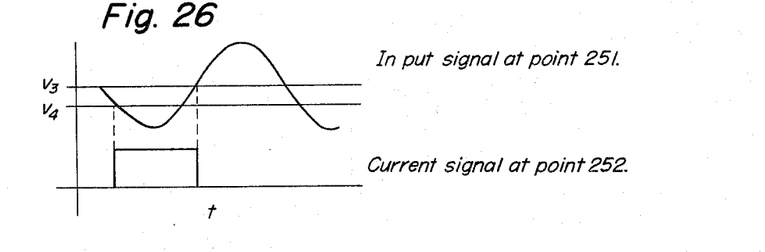
FIG. 26 shows wave forms of signals at various parts of the relay drive amplifier shown in FIG. 25.

FIGS. 25 and 26 exemplify the relay drive amplifier 188 and the relay circuit. The Schmitt circuit forming the relay drive amplifier has itself a hysteresis character, but it does not include the region of voltage $V_1$ and $V_2$, and in addition, if voltages $V_1$ and $V_2$, where $V_1>V_3$ and $V_4>V_2$, are the input at the terminal 251, a mere "on" and "off" operation appears at the connecting point 252 as current change to actuate the relay 253. The relay may be of 30 ma. magnetization, for example, with the capacity of the contact 224 of 200 ma. As shown diagrammatically in FIG. 18, the slip capacitor 180 may be connected in parallel with the synchronizing capacitor or disconnected therefrom by operation of the relay contact 189. The value of the synchronizing capacitor may be 2.5 $\mu f.$, while that of the slip capacitor 180 may be 0.5 $\mu f.$ The operation of the above-system will now be described.

The invention aims to keep a constant value of the phase difference between the signal in synchronism with the period of the electrical source driving the synchronous motor and the rotation of the rotating drum, that is to say, the phase difference between the rotationary phase of the video heads and the composite video signal, i.e., the input signal during recording. Then, the composite video signal is that which is in synchronism with the period of the electrical source driving the synchronous motor, for example, the composite video signal of source synchronization type in the United States.

Figure 27:
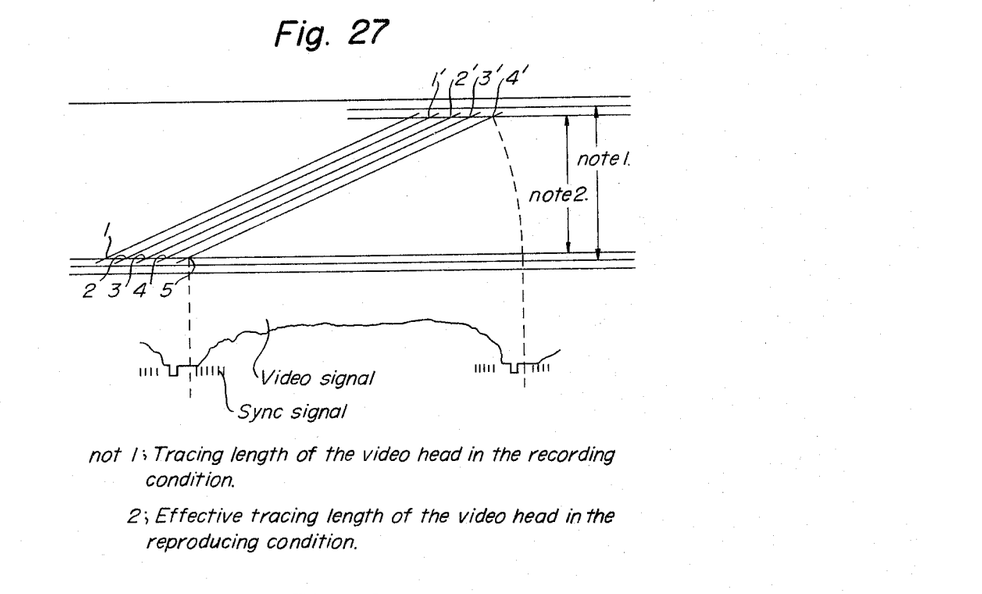
FIG. 27 shows the manner of recording operation of the image signal recording and reproducing system shown in above figures.

The video tape runs oblique to the axis of the rotating drum 161 (FIGS. 16 and 17) at about 3° 4', and the record tracks produced by the video heads during recording are as shown in FIG. 27. The track width is 250 $\mu m.$ and the track spacing is 125 $\mu m.$, while the effective track length is 345 mm. with the above-mentioned various constants.

The above-described record tracks are traced during reproducing operation by the same video heads with those used for the recording operation, and since the reproduced signal involve the overlapped amount, the signals from the video heads 162 and 163 have overlapping regions. In order that such an overlapping phenomena does not occur during reproduction, an appropriate switching operation should be effected at points A and C in FIG. 17. In addition, when the video heads 162 ann 163 has just turned through the half circular arc A—B—C, the tracing limits on the video tape are 1'-2, 2'-3, . . ., in FIG. 27, while the scanning is effected as 2-1', 3-2', . . ., and from the phase relations between the video heads, detecting head, magnets, etc., the points 1, 1', 2, 2', . . ., are the optimum switching points during the reproducing operation, and the points where the output pulse signal is obtained which is induced by the rotation of the magnets 164 and 165 in the detecting head 168. The synchronous motor 166 has a rotating speed of 1800 r.p.m., and since two magnets 164 and 165 and one detecting head 168 are combined together, the output pulse signal of the detecting head becomes 60 p.p.s.

In the recording operation, each record track produced on the video tape during the period when the video heads 162 and 163 turn just a half circular arc A—B—C corresponds to one field of the video signal, that is, $\frac{1}{60}$ sec. time interval. The afore-mentioned switching operation during the reproducing operation is preferrably effected during a blanking period of the video signal, and consequently, the positions of blanking periods of video signals during recording should be made as shown in FIG. 27. In order to effect such an operation, the phase difference between the video signal and the rotational phase of the rotating drum 161 or the video heads 162 and 163 should be kept constant during recording. However, the above-mentioned phase difference is not always constant strictly, means must be provided for converging the phase difference to a constant value irrespective of the value of existing phase difference. The slip of the synchronous motor is thus utilized for changing the phase difference.

Figure 28:
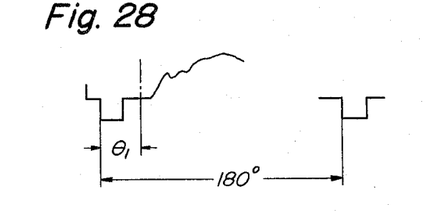
FIG. 28 shows the manner of switching effected in the system shown above.
Figure 29:
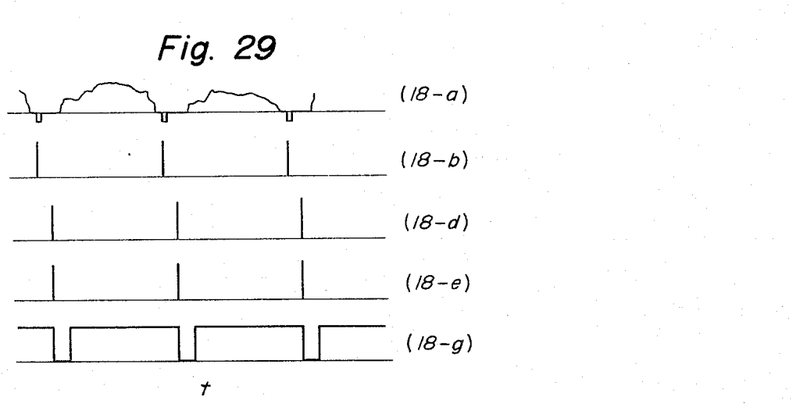
FIG. 29 shows wave forms of signals appearing at various points of the system shown in FIG. 18.

FIG. 28 graphically shows the switching point during the reproducing operation in the region of $\theta_1=8-10°$ from the front edge of the vertical sync signal. This corresponds to 1 field for 180°. FIG. 29 shows the wave relations between various parts when the above-mentioned operation is effected and the phase difference is of satisfactory value. During recording, the phase difference between the video signal 18–a and the detecting head output 18–e is shown satisfactory, with 18–a leading 18–e by $\theta_1$. In reproducing the image thus recorded, the switching point is at the position of $\theta_1$ of the video signal as shown in FIG. 28.

In FIG. 18, the video signal is partly introduced into the video heads through the recording amplifier system, and another part of the video signal is, as explained in connection with FIG. 19, converted to vertical sync signal 18–b, and triggers the following monostable multivibrator, with the pulse of 350$\mu s.$ width. The monostable multivibrator is for time-delaying, and when its output is differentiated, there is obtained an output lagging the input trigger by $\theta_1$ which may be of the above-mentioned value. This differentiated output is of the pulse of 850$\mu s.$ width. Thus, one of the input signals 18–d to the "And" circuit 184 has been determined. On the other hand, the output 18–e from the detecting head provides another input for the "And" circuit 184, along with each 60 p.p.s. pulse signal output delaying by $\theta_1$ from the front edge of the above-mentioned vertical sync signal, as explained in connection with FIG. 22. The output 18–b of the "And" circuit 184 also has the same duty ratio and becomes 60 p.p.s. pulse signal. This output 18–f triggers the monostable multivibrator 185, and as explained in connection with FIG. 23 and 24, a D.C. voltage change is obtained after having passed through the low-pass filter 186. Now referring to FIG. 18, the output 18–c of the monostable multivibrator 182 varies depending upon whether the vertical sync signal exists or not, resulting in change in the aforementioned D.C. voltage output between $V_1$ and $V_2$, the ratio therebetween being able to be selected about 1 to 8. Such a change in voltage does not call the hysteresis character of the following relay drive amplifier 187 into account.

The change in the output of the low-pass filter 186 changes the operative point of the relay drive amplifier 188 which may be of the form as shown in FIGS. 25 and 26. The change in the input to the relay drive amplifier 188 causes change-over of the relay contact 189 for disconnecting the slip capacitor 180 from the circuit, and the synchronous motor is at once pulled in the synchronous speed. When the phase difference is not $\theta_1$, the synchronous motor slips, but when the $\theta_1$ phase difference has been attained, the above-mentioned operation takes place, and the desired result is accomplished.

The inputs 18–d and 18–e are of the pulses of about 850$\mu s.$ width, as determined by the synchronous motor hunting during slip-off, the time constant of the low pass filter, the period of slip, etc. The smaller this duty ratio, the higher the certainty of accomplishing the desired result. By way of example, the time interval during which the above-mentioned synchronous motor slips during slip-off is about 2.5 sec., the trigger signal is the pulse of 850$\mu s.$ width, the time constant of the low-pass filter is 0.2 ms., and the period of slip is 5 sec.

We claim as our invention:

1. A synchronizing apparatus having a synchronous motor adapted to be driven by a suitable electrical source having a constant repeating frequency, said apparatus having a control loop and further comprising comprising means for producing a signal in synchronism with the rotation of said synchronous motor, means for obtaining a signal in synchronism with said electrical source both in frequency and phase, means for comparing the phases of said two signals with each other and for obtaining an error output signal corresponding to the difference between said phases, and means for controlling the rotational phase of said synchronous motor by utilization of a slip of said synchronous motor to maintain said error output signal always at a constant value.

2. The synchronizing apparatus according to claim 1, in which the slip of said synchronous motor is produced in correspondence to a component of said error output signal that varies with said constant value as the center, and said synchronous motor slip does not take place during a period when said error output signal is maintained at said constant value, with said control loop opened.

3. The synchronizing apparatus according to claim 1, in which said electrical source is in the form of commercial A.C. supply source.

4. The synchronizing apparatus according to claim 1, in which are provided means for producing an "on" signal in response to said error output signal being maintained at said constant value and an "off" signal in response to said error output signal being at a value other than said constant value, and means responsive to said "on" and "off" signals for terminating and producing said synchronous motor slip, respectively.

5. The synchronizing apparatus according to claim 1, in which are provided means for providing "off" and "on" error output signals depending upon said phase difference being zero and other value, respectively, and means responsive to said "off" and "on" error output signals for terminating and producing said synchronous motor slip, respectively.

6. The synchronizing apparatus according to claim 1, in which are provided means for giving a time delay corresponding to said constant value of said error output signal to either one of said two signals before comparing their phases with each other, and means for providing said constant value of said error output signal when said two signals are in phase coincidence.

7. A magnetic recording and reproducing system comprising a synchronous motor adapted to be driven by a suitable electrical source, means for producing a first signal in synchronism with the rotation of said synchronous motor, means for recording an input signal including a signal having a frequency and a phase responsive to the frequency and the phase of said electrical source, respectively, means for providing a second signal having synchronous relation with said electrical source from said input signal, means for comparing the phases of said first and second signals with each other and for providing an error output signal corresponding to the difference between said phases, and means for controlling the rotational phase of said synchronous motor by utilization of the slip of said synchronous motor to keep said error output signal at a constant value.

8. A magnetic recording and reproducing system according to claim 7, in which are provided a plurality of rotating magnetic transducers driven by said synchronous motor which is maintained in synchronous relation with said input signal.

9. A magnetic recording and reproducing system according to claim 7, in which are provided a plurality of rotating magnetic transducers driven by said synchronous motor which is maintained in synchronous relation with said input signal, means for providing said input signal in the form of wide-band composite video signal, and means for applying sync signal inserted during blanking periods of the input signal to said second signal.

10. A magnetic recording and reproducing system according to claim 7, in which are provided a plurality of rotating magnetic transducers driven by said synchronous motor which is maintained in synchronous relation with said input signal, means for providing said input signal in the form of wide-band composite video signal, and means for applying sync signal inserted during blanking periods of the input signal to said second signal, said blanking periods in the input signal are kept synchronized with the output signal of said rotating magnetic transducers during the reproducing operation.

References Cited by the Examiner
UNITED STATES PATENTS

| | | | |
|---|---|---|---|
| 2,803,792 | 8/1957 | Turner | 318—175 |
| 2,881,377 | 4/1959 | Apa | 318—175 |
| 2,944,108 | 7/1960 | Houghton | 178—6.6 |
| 3,016,428 | 1/1962 | Kabell | 178—6.6 |
| 3,097,267 | 7/1963 | Clark | 178—6.6 |

OTHER REFERENCES

Fitzgerald and Kingsley: Electric Machinery, pp. 445–452, New York, McGraw-Hill Book Company, Inc., 1952.

DAVID G. REDINBAUGH, *Primary Examiner.*

H. W. BRITTON, *Assistant Examiner.*